No. 666,567. Patented Jan. 22, 1901.
C. SKONE.
DUMPING BOX FOR WAGONS.
(Application filed May 1, 1900.)
(No Model.) 2 Sheets—Sheet 1.
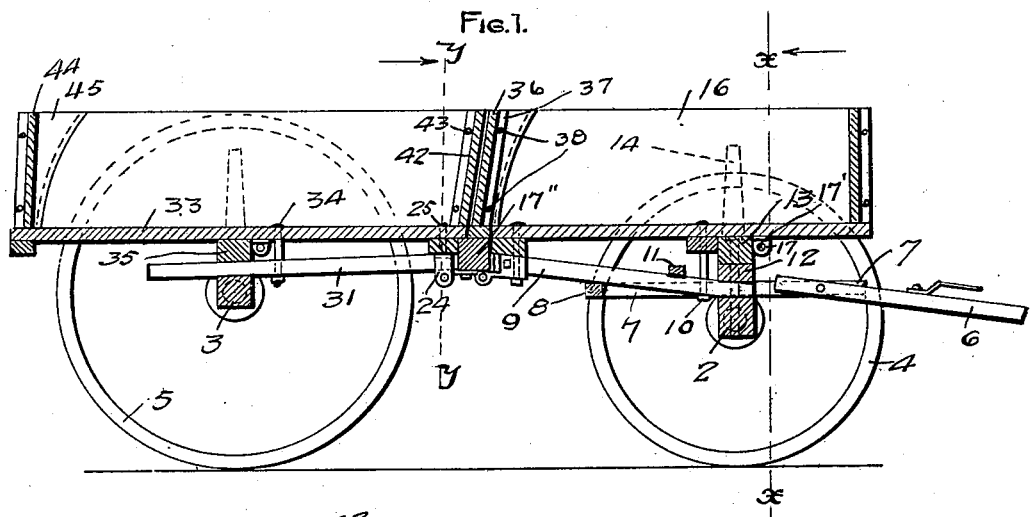
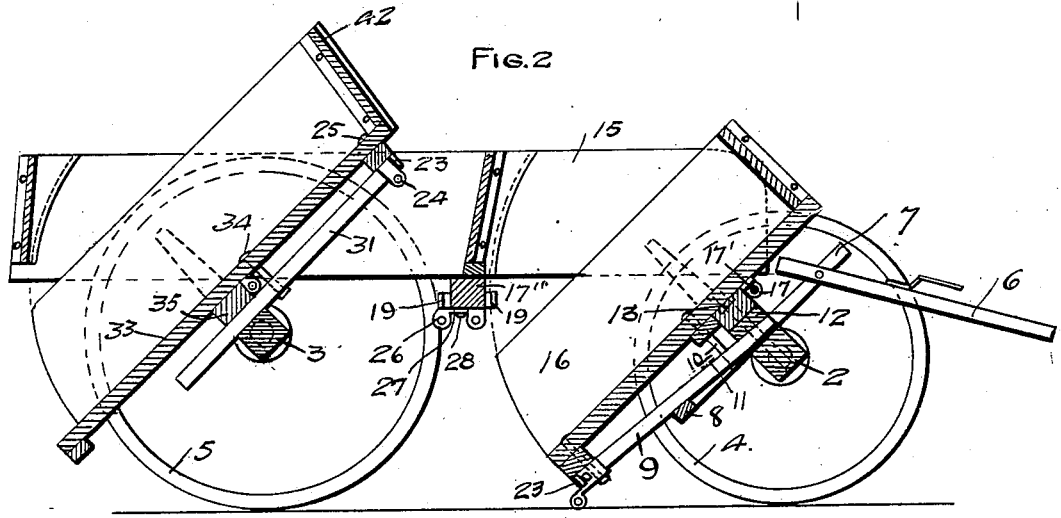
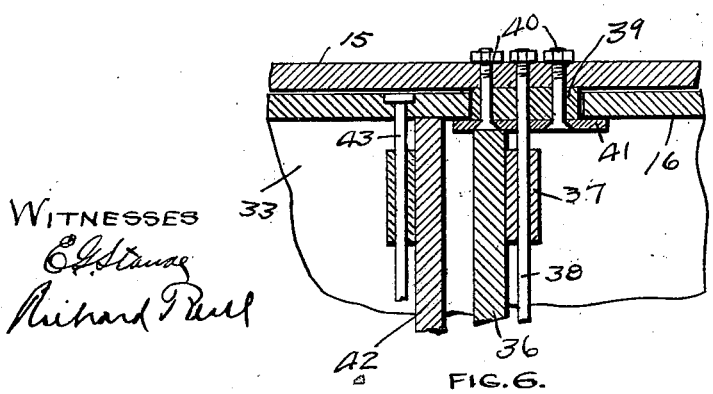
WITNESSES
INVENTOR
CHARLES SKONE
HIS ATTORNEYS No. 666,567. Patented Jan. 22, 1901.
C. SKONE.
DUMPING BOX FOR WAGONS.
(Application filed May 1, 1900.)
(No Model.) 2 Sheets—Sheet 2.
FIG. 3.
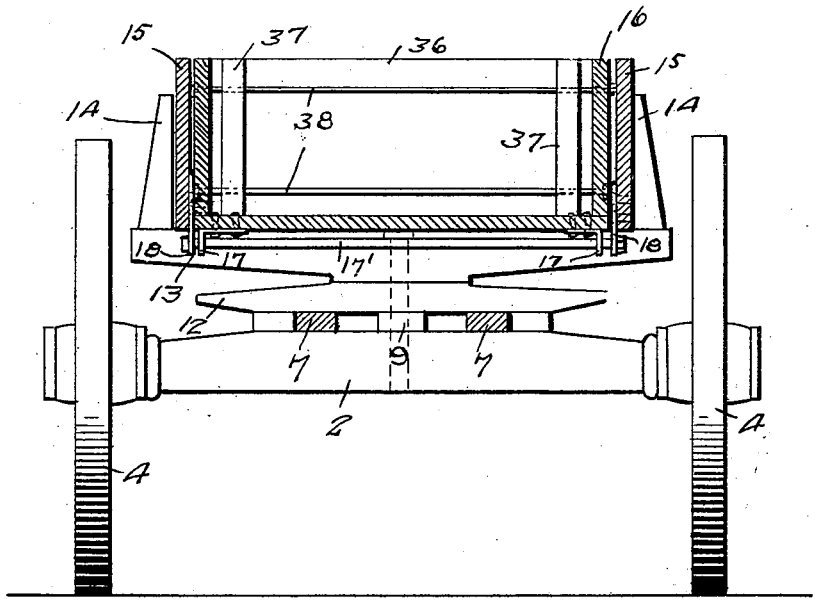
FIG. 4.
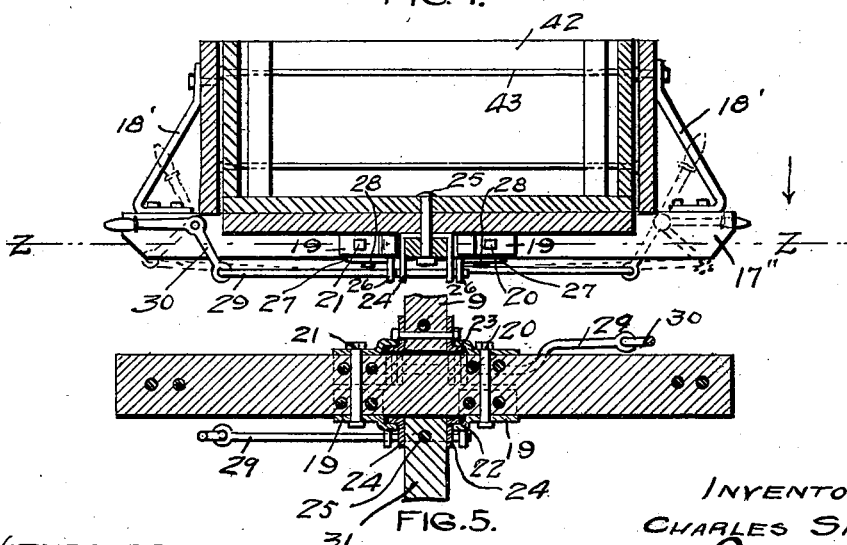
FIG. 5.
WITNESSES
INVENTOR
CHARLES SKONE
BY
HIS ATTORNEYS.

UNITED STATES PATENT OFFICE.

CHARLES SKONE, OF MINNEAPOLIS, MINNESOTA.

DUMPING-BOX FOR WAGONS.

SPECIFICATION forming part of Letters Patent No. 666,567, dated January 22, 1901.

Application filed May 1, 1900. Serial No. 15,083. (No model.)

*To all whom it may concern:*

Be it known that I, CHARLES SKONE, of Minneapolis, Hennepin county, Minnesota, have invented certain new and useful Improvements in Dumping-Boxes for Wagons, of which the following is a specification.

The invention relates to dumping-boxes for wagons; and one object of the invention is to provide a four-wheeled wagon having a box or body from which a portion of the load may be dumped when desired.

A further object is to provide a wagon-box particularly adapted for farmers and market-gardeners, wherein different varieties of fruit, grain, or vegetables may be loaded separately and conveniently transported in bulk from place to place and either variety dumped from the wagon without disturbing the rest of the load.
The invention consists generally in various constructions and combinations, all as hereinafter described, and particularly pointed out in the claims.

In the accompanying drawings, forming part of this specification, Figure 1 is a longitudinal section of a wagon embodying my invention. Fig. 2 is a similar view showing the boxes in a tilted position. Fig. 3 is a transverse section on the line *x x* of Fig. 1.
Fig. 4 is a similar view on the line *y y* of Fig. 1. Fig. 5 is a section on the line *z z* of Fig. 4. Fig. 6 is a detail showing the manner of securing the transverse board or plate between the dumping-boxes.
In the drawings, 2 represents the forward axle; 3, the rear axle; 4, the forward wheels, and 5 the rear wheels.

6 represents the pole, pivotally connected to the pole or tongue hounds 7, which are secured to the axle 2 and, extending back of the same, are connected at their rear ends by the cross-bar 8.

9 is a short reach having its forward end resting upon the axle 2 and provided with a hole to receive the king-bolt and secured to the floor of the dumping-box above by a bolt 10 or in any other suitable way. A cross-bar 11 passes over said reach, connecting the hounds 7 and forming therewith and with the bar 8 a fifth-wheel, said bars 8 and 11 sliding back and forth on the reach as the axle is turned from side to side. Above the forward end of the reach is a rocker-bar 12, secured to the axle and to the hounds 7 by bolts passing down through the same and supporting the bolster 13, upon which the forward dumping box or body is secured. The usual king-bolt passes down through the floor of the body through the bolster and rocker-bar into the axle. Suitable side stakes 14 are provided in the ends of the bolster, and inside said stakes, resting upon the bolster, are the side-boards 15, extending, preferably, the full length of the wagon-body.

Between the forward ends of the side-boards 15 I arrange the forward dumping-box 16, provided underneath its floor with brackets 17, that are pivotally connected to ears 18 on the side-boards 15 by rods 17', so that when the box is tilted it will swing on its pivots down to the inclined position shown in Fig. 2 and the forward axle will rock with the tilting of said box, but may be readily returned to its normal position by the operator or by the forward movement of the wagon.

Between the forward and rear wheels connecting the side-boards 15 I prefer to provide a cross-bar 17'', rigidly secured at its end to said side-board by braces 18', and provided upon each side, near its center, with angle-plates 19, secured by bolts 20 and provided with outwardly-turned ends 22, forming sockets with the sides of the bar 17 to receive the flanged end of plates 23, provided on the rear end of the reach 9 and on the forward end of the rear reach, as hereinafter described. A U or clevis shaped plate 24 is provided on the rear end of the reach 9 and has a hole to receive a bolt 25, that passes through the floor of the dumping-box 16 and the rear end of the reach, thus securing the parts firmly together. The depending ends or legs of the part 24 are provided with holes which are opposite corresponding holes in the depending ends 26 of brackets 27, that are secured to the under side of the bar 17 by bolts 28. A rod 29 is adapted to slide in the holes in said brackets and in said part 24 and is pivotally connected at its outer end to one arm of a lever 30, that is in turn pivoted on the cross-bar 17, outside the wagon-box. When this lever and the rod 29 are in the position shown in Fig. 4, the forward dumping-box will be locked and prevented from tilting until the lever is raised to the position indicated by dotted lines in Fig. 4, when the rod 29 will be drawn out and the dumping-box released.

31 represents the reach of the rear dumping-box, and its forward end is provided with plates corresponding to the plates 23, heretofore described, and said reach is secured to the floor of the rear dumping-box and with said box is locked against tilting in the same manner as heretofore described with reference to the forward dumping-box, except that the locking mechanism is arranged upon the opposite side of the wagon in the rear of the cross-bar 17. The rear end of the reach 31 rests upon the rear axle 3 and is preferably secured to the floor of the rear dumping-box 33 by a bolt 34, and beneath said floor, resting upon said reach, I arrange a bolster 35, that is secured to the axle by bolts or in any other suitable way, so that when the rear box is tilted the rear axle will rock with it and allow the load to be dumped. The floor of the rear dumping-box is pivotally connected to the side-boards 15 in the same manner as described with reference to the forward dumping-box, and these pivotal connections, as will be noted in Figs. 1 and 2, are both in advance of the axle centers, and consequently the movement of the wagon after the boxes are dumped will cause them to return to their normal horizontal position.

As shown in Fig. 6, I prefer to provide a board 36 between the side-boards 15 and separating the rear end of the forward dumping-box from the forward end of the rear box. This board is preferably provided with the vertical end bars or slats 37, having holes at the top and bottom to receive the long rods 38, which support the board 36 between the side-boards of the wagon and permit its ready removal. At the end of the board 36 I prefer to provide the blocks 39, secured to the side-boards by bolts 40 or in any other suitable way, and provided with plates 41, secured by said bolts 40 and overhanging said blocks. The forward edges of the blocks 39 are preferably curved to form a close joint with the curved ends of the forward dumping-box, and the plates 41, overlapping said curved ends, prevent the material that is being carried in the wagon from working in between the dumping-boxes and the side-boards and preventing the ready tilting of the boxes. The dumping-boxes are preferably provided with end-boards 42, which are removably secured by bolts 43. At the rear ends of the side-boards I prefer to provide a tail-board 44, having curved edges 45, adapted to form close joints with the sides of the rear dumping-box.

This wagon is particularly adapted for the use of farmers for distributing fertilizer on the land, as each box may be filled with the fertilizing material and a portion only of the load dumped in any desired spot in the field without disturbing the remainder of the load. A large load may thus be rapidly and easily distributed which when hauled in an ordinary four-wheeled wagon must be thrown or dragged out of the wagon-box with forks adapted for that purpose, an operation necessarily involving considerable time and labor. My wagon is also adapted for use in transporting vegetables of different kinds or in hauling grain in bulk from the fields to the granary or to the market. The dumping-boxes being rigidly secured to the axles, there are no hinges to be wrenched or subjected to severe strains and liable to become disconnected or broken.

The devices which I have herein shown and described for locking the tilting boxes in a horizontal position and the method shown for securing them to the axles may be modified by any one skilled in the art without departing from the spirit of my invention.

Having thus described my invention, I claim as new and desire to secure by Letters Patent—

1. In a wagon, the combination, with a wheeled frame, of tilting or dumping boxes supported respectively on the axles of said frame, side-boards connecting said axles, said boxes being pivotally connected to said side-boards in front of the centers of said axles and below the floors of said boxes, each axle and box being adapted to tilt independently of the other axles and boxes, and means for locking said boxes in a substantially horizontal position, substantially as described.

2. In a wagon, the combination, with the forward and rear axles and the wheels therefor, of the side-boards connecting said axles, the forward and rear dumping boxes supported respectively on said axles, pivotal connections provided between said dumping-boxes and said side-boards, means for locking said dumping-boxes in a horizontal position and the dividing-board provided between said dumping-boxes, substantially as described.

3. In a wagon, the combination, with the forward axle, of the side-boards resting thereon, the dumping-box rigidly secured to said axle and adapted to tilt therewith, a pivotal connection provided between said dumping-box and said side-boards in front of the center of said axle and below the floor of said box and means for locking said dumping-box in a horizontal position, substantially as described.

4. In a wagon, the combination, with the forward axle, of the dumping-box secured thereon and adapted to tilt therewith, the side-boards resting upon said axle and pivotally connected with said dumping-box, a cross-bar connecting said side-boards at the rear end of said dumping-box, and the locking device provided on said cross-bar and operating laterally with respect to said dumping-box to lock the same in a horizontal position, substantially as described.

5. The combination, with the dumping-box reach 9 having the angle-plates 23, of the cross-bar 17, plates 19 provided on said cross-bar and having the outwardly-turned ends 22 forming sockets with said bar 17 to receive the angle ends of said plates 23, substantially as described.

6. The combination, with a dumping-box reach 9 provided with the clevis 24, of the cross-bar 17 having the brackets 27 said brackets and said clevis being provided with holes adapted to register, a rod 29 slidable in the holes in said brackets and said clevis and a lever 30 provided on said bar 17 and connected with said rod 29, for the purpose specified.

7. In a wagon, the combination, with the forward and rear axles and the wheels therefor, of side-boards connecting said axles, a dumping-box rigidly secured to the forward axle and adapted to tilt therewith, pivotal connections provided between said dumping-box and said side-boards, a cross-bar connecting said side-boards near the rear end of said dumping-box, a locking device provided on said cross-bar and adapted to engage the end of said box and lock the same in a horizontal position, a second dumping-box mounted on the rear axle and also pivotally connected to said side-boards, and a second locking device provided on said cross-bar and engaging the forward end of said second dumping-box, substantially as described.

8. In a wagon, the combination, with the forward axle, of the dumping-box secured thereon and adapted to tilt therewith, side-boards resting upon said axle and pivotally connected with said dumping-box, a cross-bar connecting said side-boards at the rear end of said dumping-box, and a locking device provided on said cross-bar and adapted to engage the rear end of said box and lock the same in a horizontal position, substantially as described.

9. In a wagon, the combination, with the forward and rear axles, and the wheels therefor, of side-boards connecting said axles, forward and rear dumping-boxes supported respectively upon said axles, pivotal connections provided between said dumping-boxes and said side-boards, means for locking said boxes in a horizontal position, a dividing-board provided between said boxes and adapted to close the rear end of said forward box when in a horizontal position, and blocks having curved sockets provided on said side-boards and adapted to receive the curved rear ends of the sides of said forward box, substantially as described.

10. In a wagon, the combination, with the forward axle, of side-boards resting thereon, a dumping-box pivotally connected to said side-boards and resting upon said axle, a rocker-bar and bolster provided on said axle beneath said box, tongue-hounds 7 provided on said axle, a reach 9 having a hole near its forward end to receive the axle king-bolt and secured at its rear end to said dumping-box, and a bolt 10 passing through the floor of said box and through said reach, substantially as described.

11. In a wagon, the combination, with the forward axle, of side-boards resting upon said axle and provided with ears 18 in front thereof, a dumping-box secured upon said axle, brackets 17 provided on said dumping-box and rods 17' passing through said ears and said brackets and whereby said dumping-box is pivotally connected to said side-boards, substantially as described.

In witness whereof I have hereunto set my hand this 28th day of April, 1900.

CHARLES SKONE.

In presence of—
RICHARD PAUL,
M. C. NOONAN.